(12) United States Patent
Toyama

(10) Patent No.: US 6,349,713 B1
(45) Date of Patent: Feb. 26, 2002

(54) COOKING STOVE

(75) Inventor: Seiichi Toyama, Sanjo (JP)

(73) Assignee: Green Life Co., Ltd., Niigata-Pref (JP)

( * ) Notice: Subject to any disclaimer, the term of this patent is extended or adjusted under 35 U.S.C. 154(b) by 0 days.

(21) Appl. No.: 09/493,236

(22) Filed: Jan. 28, 2000

(30) Foreign Application Priority Data

Jan. 29, 1999 (JP) .......................................... 11-022813

(51) Int. Cl.[7] ................................................ F24B 3/00
(52) U.S. Cl. ...................................... 126/26; 126/25 R
(58) Field of Search ............................ 126/25 R, 26, 126/27, 24, 279, 201

(56) References Cited

U.S. PATENT DOCUMENTS

| | | | |
|---|---|---|---|
| 997,326 A | * | 7/1911 | Rademacher |
| 2,102,217 A | * | 12/1937 | Polhemus |
| 2,898,846 A | * | 8/1959 | Del Francia |
| 3,322,060 A | * | 5/1967 | Gilbert |
| 4,471,751 A | | 9/1984 | Hottenroth et al. |
| 4,722,322 A | | 2/1988 | Varney et al. |
| 4,747,781 A | | 5/1988 | Patenaude |
| 4,759,276 A | | 7/1988 | Segroves |
| 4,813,397 A | | 3/1989 | Yamada |
| 4,884,554 A | | 12/1989 | Yanagida |
| 5,797,386 A | * | 8/1998 | Orr |

FOREIGN PATENT DOCUMENTS

| | | |
|---|---|---|
| JP | 1-256916 | 10/1989 |
| JP | 5-31743 | 4/1993 |

\* cited by examiner

*Primary Examiner*—Carl D. Price
(74) *Attorney, Agent, or Firm*—Sughrue Mion, PLLC

(57) ABSTRACT

To provide a novel barbecue stove, a cooking stove includes an outer frame and an inner frame having an opening portion at its upper portion and disposed within the outer frame. A flame lattice is provided within the inner frame. A multi-layer structure space partitioned by a partitioning member is formed between the outer frame and the inner frame. The space is formed into an air flow passage through which outside air to be introduced from one position is discharged from the other position.

4 Claims, 3 Drawing Sheets

COOKING STOVE

BACKGROUND OF THE INVENTION

The present invention relates to a cooking stove and more particularly to a barbecue stove.

Conventionally, a heat insulating structure type barbecue stove (hereinafter referred to as a conventional example) composed of an outer frame and an inner frame disposed within the outer frame and having an opening portion at its upper portion has been proposed.

In this conventional example, the inner frame is disposed under the suspension condition through a predetermined space (insulating space) within the outer frame. A side wall and a bottom wall of the inner frame is made of heat insulating material such as asbestos or the asbestos is provided on the side wall and the bottom wall of the inner frame made of metal so that the heat generated within the inner frame is prevented from being transferred to the outside and the temperature of the surface of the outer frame is prevented from being elevated.

However, in the conventional example, the asbestos that constitutes the side wall and the bottom wall as described above is expensive. Furthermore, an additional step for molding and fitting the heat insulating material is required. Thus, the conventional example suffers from not only a cost problem but also a difficulty in mass production. Also, the asbestos itself causes the public contamination.

SUMMARY OF THE INVENTION

In order to overcome the above-noted defects inherent in the conventional system, an object of the present invention is to provide a cooking stove that may exhibit the positive heat insulating effect and that is superior in mass production aspect in a less expensive manner.

According to a first aspect of the present invention, to attain this and other objects, there is provided a cooking stove includes an outer frame and an inner frame having an opening portion at its upper portion and disposed within said outer frame. A flame lattice is provided within the inner frame. A multi-layer structure space partitioned by a partitioning member is formed between the outer frame and the inner frame. The space is formed into an air flow passage through which outside air to be introduced from one position is discharged from the other position.

According to a second aspect of the invention, it is preferable that the inner frame is disposed in the outer frame through spaces $S_1$ and $S_2$ partitioned by a partitioning member for partitioning the inner frame. It is also preferable that the spaces $S_1$ and $S_2$ are formed into the air flow passage for discharging the outside air introduced from the one position to the other position.

Preferably, according to a third aspect of the invention, through holes having an air introduction function are provided in a circumferential surface of the outer frame and through holes having an air discharging function are provided in an upper portion of the outer frame so that the air flow passage is formed by the through holes having the air introduction function, the through holes having the air discharging function and the space $S_2$.

More preferably, according to a fourth aspect of the invention, through holes having the air introduction function are formed in a circumferential surface of the partitioning member, through holes having the air discharging function are formed in an upper portion of the inner frame, and the air flow passage is formed by the through holes having the air introduction function, the through holes having the air discharging function and the space $S_1$.

According to a fifth aspect of the present invention, for example, when the fuel (charcoal) is burnt on the flame lattice within the inner frame, the heat within the space is discharged to the outside by the air flow passage R which is formed in the multi-layer space between the outer frame and inner frame and through which the outside air introduced from one position is discharged to the other position.

According to the first aspect of the present invention, because the space is formed into the multi-layer structure, it is possible to suppress the heat transfer to the outer frame correspondingly. Furthermore, the heat within the space may be effectively discharged to the outside by the space as the heat insulating air layer constituted by the air flow passage partitioned by the partitioning member between the inner and outer frames. Accordingly, the surface of the outer frame is prevented from being heated as much as possible. This stove is very safety. This may be used as a usual stove and may be used as a table cooking stove. This is very useful in practical aspect. Furthermore, the stove may be manufactured in low cost in comparison with the conventional one. Thus, the stove is novel and superior in cost aspect and mass production aspect because of the simplified structure.

According to the second aspect of the invention, in addition to the effect obtained by the first aspect, the side wall and the bottom wall of the heat insulating structure provided in the inner frame are not formed of insulating material such as asbestos as in the conventional stove but the inner frame is disposed in the outer frame through spaces $S_1$ and $S_2$ partitioned by a partitioning member for partitioning the inner frame. Thus, the spaces $S_1$ and $S_2$ are provided for the double heat insulating structure. Accordingly, it is possible to obtain a good heat insulating effect and to effectively suppress the transfer of the heat generated within the inner frame to the outer surface of the outer frame. Furthermore, the stove may be manufactured in low cost in comparison with the conventional one. Thus, the stove is novel and superior in cost aspect and mass production aspect because of the simplified structure.

Also, according to the third aspect of the invention, in addition to the effect obtained by the second aspect, the heat generated in the inner frame may be effectively discharged to the outside by both the air flow passage R provided between the space $S_1$ between the inner frame and the partitioning member and the air flow passage R provided between the space $S_2$ between the outer frame and the partitioning member. Accordingly, it is possible to obtain a better heat insulating effect and to effectively suppress the transfer of the heat generated within the inner frame to the outer surface of the outer frame to provide a novel stove.

Also, according to the fourth aspect of the invention, in addition to the effect obtained by the third aspect, the heat generated between the outer frame and the partitioning member may be effectively and positively discharged to the outside from the air flow passage R and the structure of the air flow passage is extremely simple. The stove may be manufactured in low cost in comparison with the conventional one. Thus, the stove is novel and superior in cost aspect and mass production aspect because of the simplified structure.

Also, according to the fifth aspect of the invention, in addition to the effect obtained by the third or fourth aspect, the heat generated between the inner frame and the partitioning member may be effectively and positively discharged to the outside from the air flow passage R and the structure of the air flow passage is extremely simple. The stove may be manufactured in low cost in comparison with the conventional one. Thus, the stove is novel and superior in cost aspect and mass production aspect because of the simplified structure.

DESCRIPTION OF THE PREFERRED EMBODIMENTS

An embodiment of the present invention will now be described with reference to the accompanying drawings.

Figure 1:
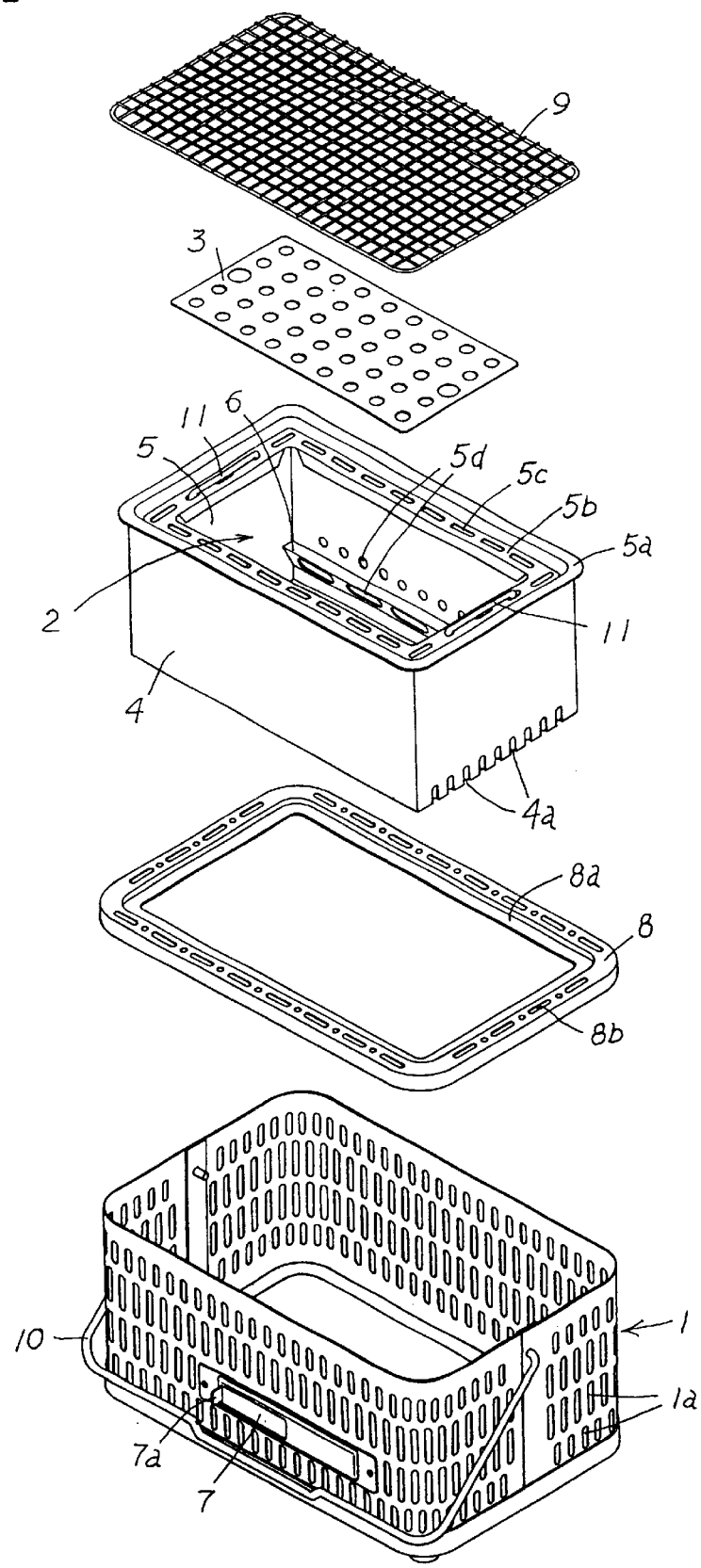
FIG. 1 is an exploded perspective view showing a cooking stove according to an embodiment of the invention.
Figure 2:
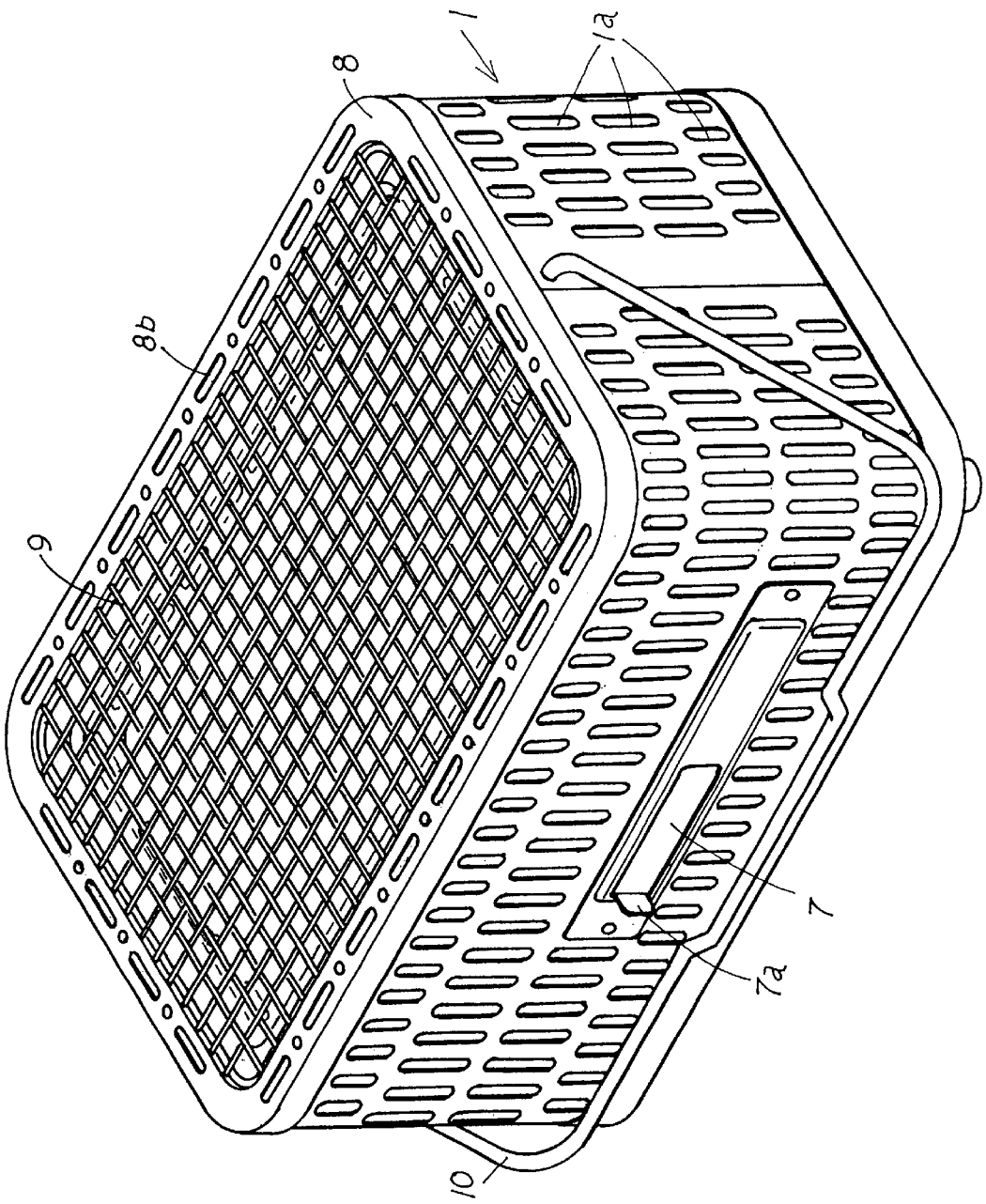
FIG. 2 is a perspective view showing the cooking stove shown in FIG. 1.
Figure 3:
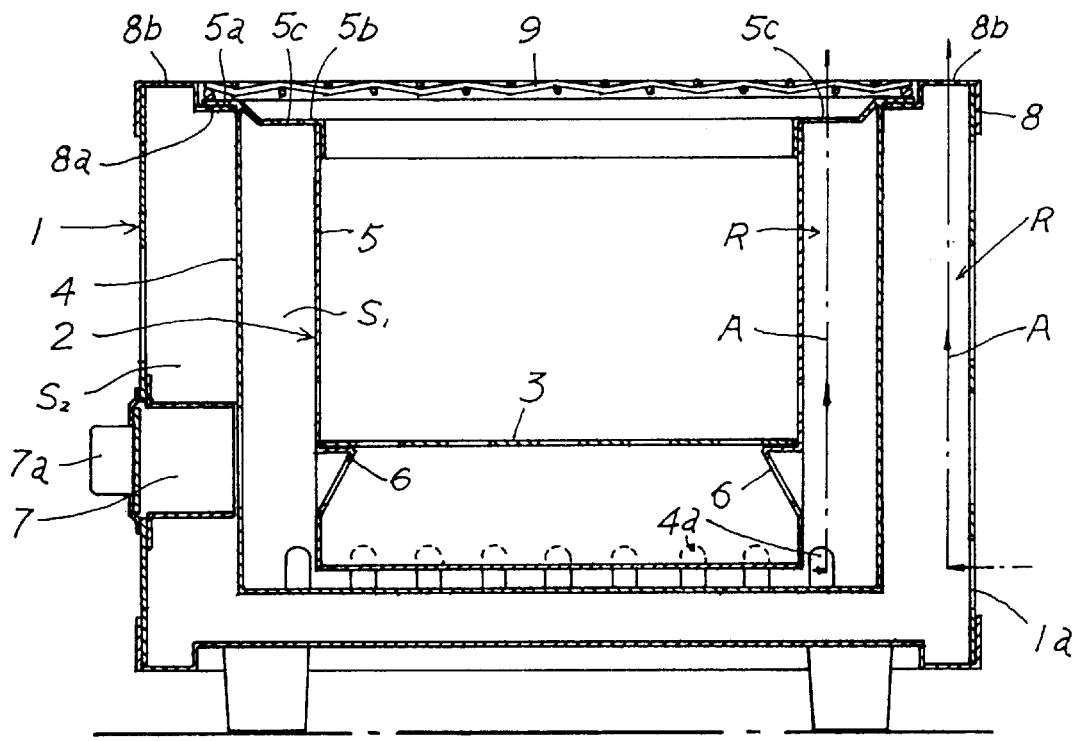
FIG. 3 is a cross-sectional view showing the heat insulating structure in accordance with the embodiment of the invention.

As shown in FIG. 1, an outer frame 1 is made of suitable metal material and provided with a number of through holes 1a on its side wall. The through holes 1a provided in a circumferential surface of the outer frame 1 serves as air introduction holes for introducing the outside air into a predetermined space $S_2$ between the outer frame 1 and the inner frame 2 when the outer frame 1 and the inner frame 2 are arranged through the predetermined space $S_2$.

Also, a rectangular retainer member 8 is fitted on the upper opening edge portion of the outer frame 1. A stepped portion 8a from which the inner frame 2 is retained in a suspended condition and on which a mesh member 9 may be laid is formed in this retainer member 8. Furthermore, a number of through holes 8b are provided in an upper stage of the retainer member 8. The through holes 8b provided in the retainer member 8 are the air discharging holes for discharging to the outside the air that has passed through the space $S_2$. An air flow passage R is defined by the through holes 8b having the air discharging function, the through holes 1a having the above-described air introducing function and the space $S_2$.

As shown in FIG. 1, the inner frame 2 is constituted by a receptacle 5 that is made of suitable metal. A side wall 4 is formed integrally with the receptacle 5 through a predetermined space $S_1$. The integration between the side wall 4 and the receptacle 5 is formed by welding the upper opening edge portion of the side wall 4 to a flange 5a projecting outwardly from the upper opening edge portion of the receptacle 5. This side wall 4 is the partitioning member 4 which partitions the gap between the outer frame 1 and the inner frame 2 to form the spaces $S_1$ and $S_2$ when the inner frame 2 is arranged in the outer frame 1.

Also, the edge portion of the flange 5a of the inner frame 2 to which the upper opening edge portion of the side wall 4 has been welded is formed so as to be retained along the stepped portion 8a of the retainer member 8 retained at the outer frame 1. The edge portion is retained along the stepped portion 8a of the retainer member 8 so that the inner frame 2 is disposed in the suspended condition through the predetermined space $S_2$ in the outer frame 1.

Also, a stepped portion 5b is formed inside of the flange 5a. A number of through holes 5c are formed in the stepped portion 5b. Furthermore, a number of through holes 4a are formed at a lower position of a side surface of the partitioning member 4.

The through holes 4a provided in the lower position of the side surface of the partitioning member 4 are the air introduction holes for introducing the outside air to the space $S_1$ between the inner frame 2 and the partitioning member 4. The through holes 5c provided at the edge portion of the upper opening of the inner frame 2 are the air discharging holes for discharging to the outside the air that has passed through the space $S_1$. The air flow passage R is defined by the above-described through holes 4a having the air introduction function, the through holes 5c having the air discharging function and the space $S_1$.

A plurality of projecting portions 6 are formed on the inner surface of the inner frame 2 and a flame lattice 3 is laid on the projecting portions 6.

The reference character 5d denotes air intake holes for sucking the air into the inner frame 2, numeral 7 denotes an air supply window having an opening/closing door 7a, numeral 10 denotes a carry grip and numeral 11 denotes removal grips for the inner frame 2 that may be drawn as desired.

The heat insulating structure for the barbecue stove in accordance with the present embodiment will now be described.

For instance, when the fuel such as charcoal is burnt on the flame lattice 3 within the inner frame 2, the interior of the spaces $S_1$ and $S_2$ are heated, respectively. However, cold outside air A is introduced into the spaces $S_1$ and $S_2$ through the air introduction holes 1a and 4a (natural suction). At the same time, the hot air within the spaces $S_1$ and $S_2$ is raised to be discharged through the air discharging holes 8b and 5c. Thus, in accordance with this embodiment, the heat generated within the inner frame 2 is effectively discharged to the outside by the air flow passage R. Since this is not attained by providing a special means such as any air introduction device or air discharging device to thereby reduce the cost in an extreme state.

According to the present embodiment, the heat of the spaces $S_1$ and $S_2$ is effectively discharged to the outside through the air flow passage R. Accordingly, the spaces $S_1$ and $S_2$ may exhibit the functions as the heat insulating layers. The surface of the outer frame 1 may be prevented from being heated as much as possible. This is quite safety. Not only may it be used as a usual barbecue stove but also may it be most suitably used as a table barbecue stove. In addition, the heat insulating material such as asbestos may be dispensed with in comparison with the conventional system. This would be superior in manufacture cost and also in mass production property because of simplified structure.

According to the present embodiment, a double structure is taken by providing the partitioning member 4 in the inner frame 2 and the spaces $S_1$ and $S_2$ are provided between the inner wall of the outer frame 1 and the outer wall of the inner frame 2. However, it is possible to take the double structure of the outer frame 1 (the partitioning member 4 may be welded to the retainer member 8). In brief, it is sufficient that a multi-layer structure space partitioned by the partitioning member 4 is formed between the outer frame 1 and the inner frame 2 so that the air flow passage R may be formed in each space.

What is claimed is:

1. A cooking stove comprising an outer frame having circumferential side walls with a plurality of through holes and a bottom wall secured thereto, a retainer member mounted on an upper edge of said circumferential side walls and having an upper surface with a plurality of through holes and an inwardly extending step portion, an inner frame comprised of circumferential side walls and a bottom wall with an outwardly extending flange at a top edge of the circumferential side walls for removably supporting said inner frame on said step portion, said outwardly extending flange having a plurality of through holes therein, a pair of inwardly directed support members on said opposite side walls within the inner frame for removably supporting a flame lattice, said inner frame having through holes adjacent said support members and an intermediate frame having circumferential side walls and a bottom wall located in spaced relation between said inner frame and said outer frame with the circumferential side walls thereof secured to and depending from said outwardly extending flange and having through openings therein, wherein a first air flow passage is defined between said intermediate frame and said inner frame extending between said through openings in said intermediate frame, said through holes in said inner frame and said through holes in said outwardly extending flange and a second air flow passage is defined between said intermediate frame and said outer frame extending between the through holes in the circumferential side walls of said outer frame and the through holes in said retainer member.

2. A cooking stove as set forth in claim 1 further comprising handle means connected to said outwardly extending flange of said inner frame for removing said inner frame and said intermediate frame from said outer frame.

3. A cooking stove as set forth in claim 1 further comprising handle means connected to said outer frame for transporting the cooking stove.

4. A cooking stove as set forth in claim 1 further comprising an air supply passage connecting to said outer frame and extending between said outer frame and said intermediate frame to provide air communication from outside the outer frame to said inner frame below said lattice through apertures in said intermediate frame and said inner frame, and a moveable door on said outer frame for opening and closing said air supply passage.

* * * * *